Sept. 20, 1932.  W. W. HICKS  1,878,140
ELECTRICAL HEATING DEVICE
Filed Jan. 9, 1928   3 Sheets-Sheet 1
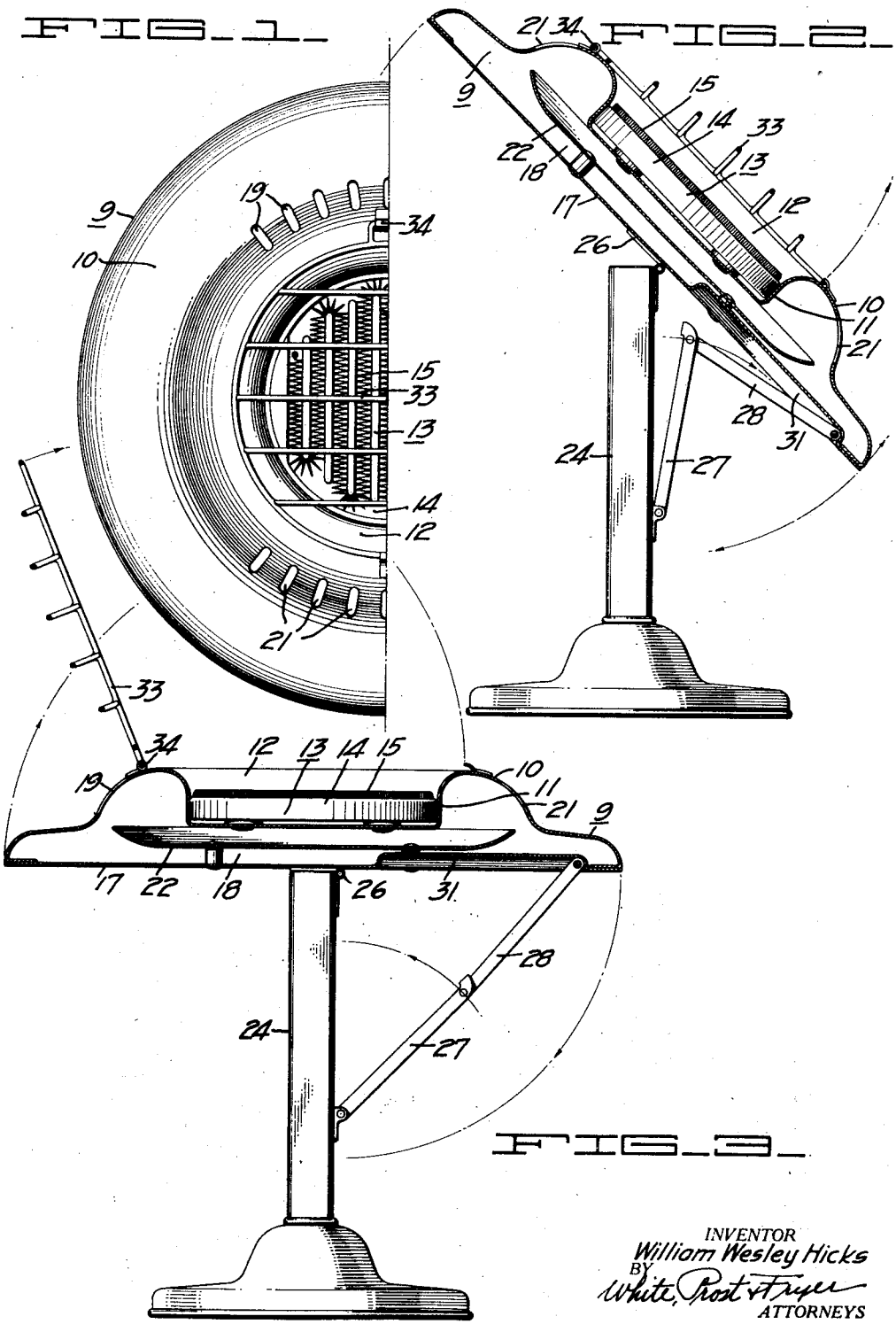
INVENTOR
William Wesley Hicks
BY
White, Prost & Fryer
ATTORNEYS Sept. 20, 1932.                W. W. HICKS                1,878,140
                         ELECTRICAL HEATING DEVICE
                         Filed Jan. 9, 1928      3 Sheets-Sheet 2
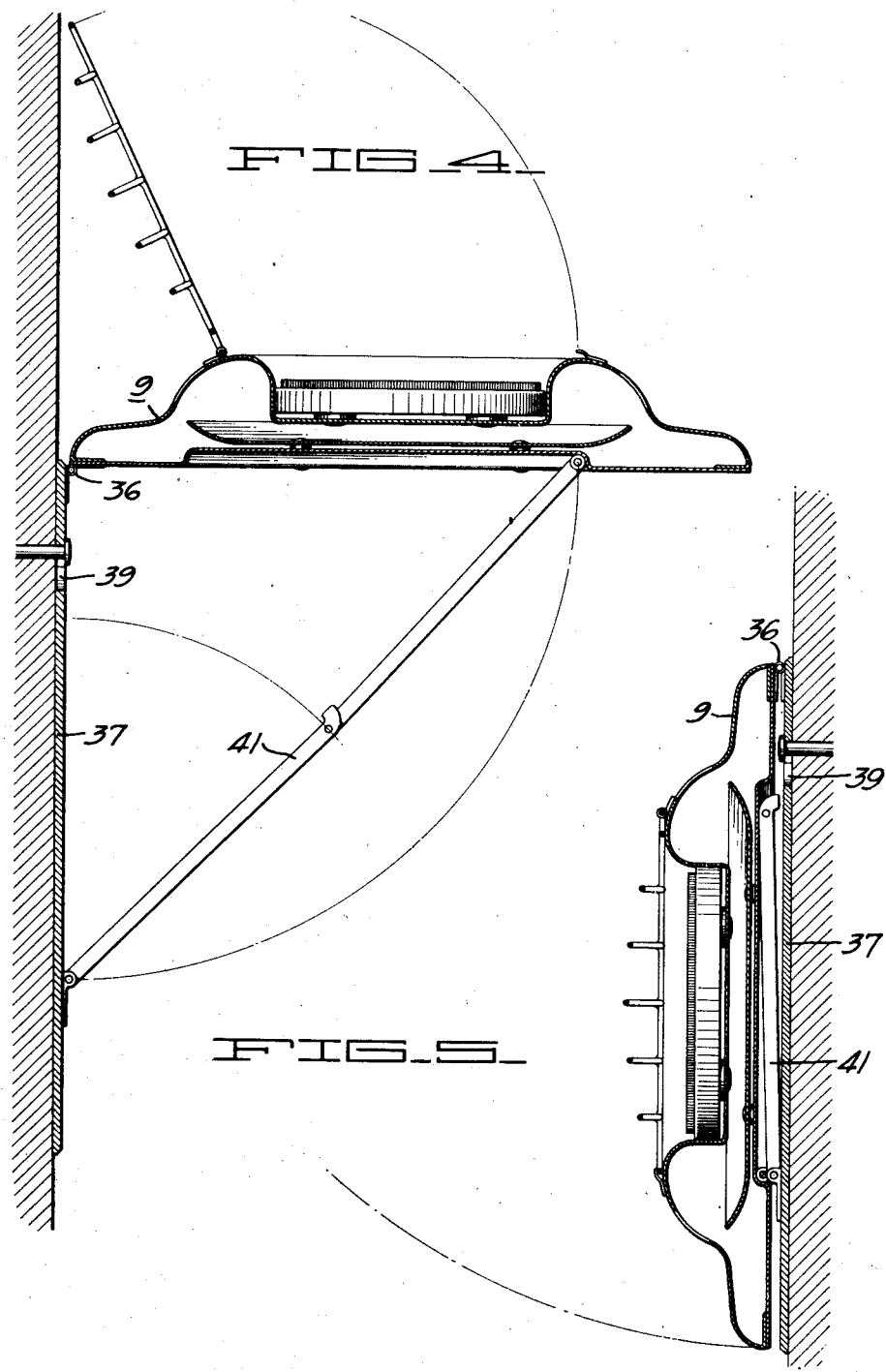
INVENTOR
William Wesley Hicks
BY
White, Prost & Fryer
ATTORNEYS Sept. 20, 1932.　　　W. W. HICKS　　　1,878,140
ELECTRICAL HEATING DEVICE
Filed Jan. 9, 1928　　　3 Sheets-Sheet 3
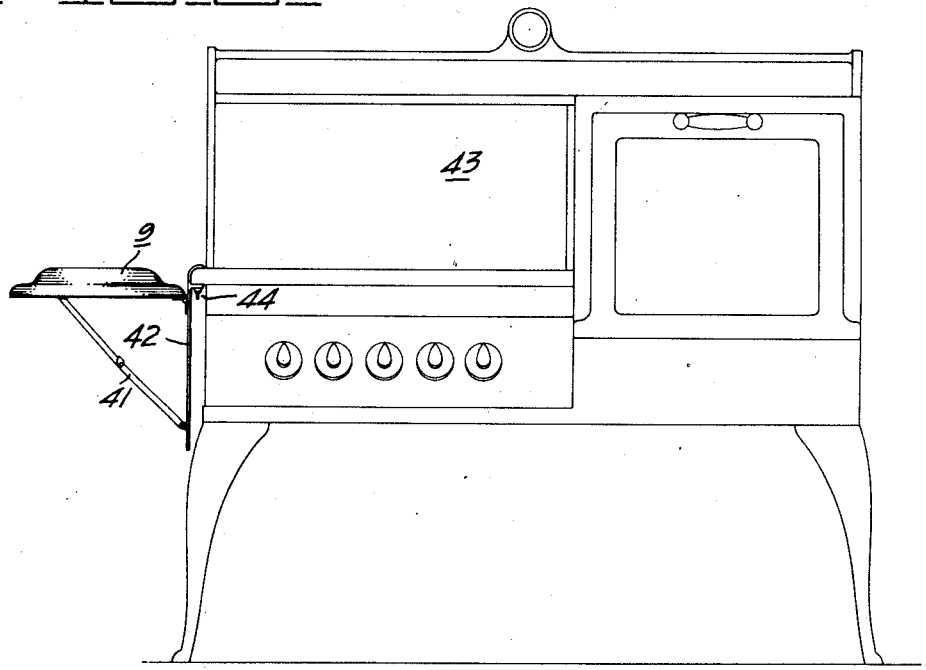
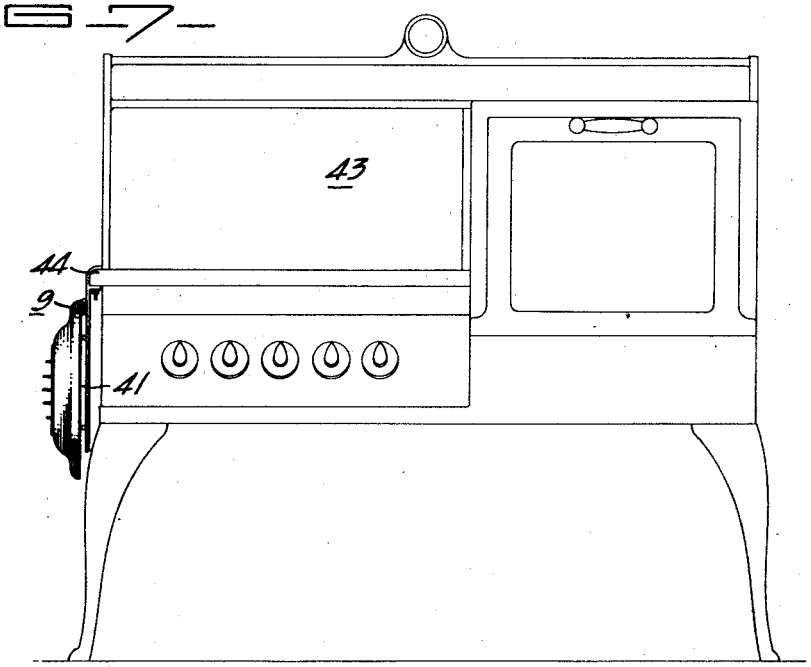
INVENTOR
William Wesley Hicks
BY
ATTORNEYS Patented Sept. 20, 1932

1,878,140

UNITED STATES PATENT OFFICE

WILLIAM WESLEY HICKS, OF SAN FRANCISCO, CALIFORNIA, ASSIGNOR TO WESIX NATIONAL COMPANY, OF SAN FRANCISCO, CALIFORNIA, A CORPORATION OF DELAWARE

ELECTRICAL HEATING DEVICE

Application filed January 9, 1928. Serial No. 245,291.

This invention relates generally to electrical heating devices, particularly devices capable of universal application.

It is an object of this invention to devise an electrical heating device of increased utility which will function either as a room heater or as a hot plate for cooking.

It is a further object of this invention to devise improved structures for mounting and supporting an electrical heating element so that this element may be swung from a general upright position in which it may function as a room heater, to a general horizontal position in which it may be utilized as an electrical hot plate.

It is a further object of this invention to devise an electrical hot plate structure which may be readily clamped to an ordinary cooking range so as to provide an emergency or auxiliary cooking appliance and which may be swung to an out of the way position.

Further objects of the invention will appear from the following description in which I have set forth the preferred embodiment of my invention. It is to be understood that the appended claim is to be accorded a range of equivalents consistent with the state of the prior art.

Referring to the drawings:

Figure 1 is a front view of the body member and electrical heating element of a portable electrical appliance.

Fig. 2 is a side elevational view partly in cross section illustrating this invention incorporated in a portable electrical appliance.

Fig. 3 is a side elevational view similar to Fig. 1, but illustrating the body member as having been moved to a horizontal position.

Fig. 4 is a cross sectional elevational view illustrating the invention incorporated in a wall type of heater.

Fig. 5 is a view similar to Fig. 4 but illustrating the device in lowered position in which it may serve as a room heater.

Fig. 6 is a side elevational view illustrating the invention applied to an auxiliary heating appliance for a cooking stove.

Fig. 7 is a view similar to Fig. 6 but illustrating the device as being moved to an out of the way position in which it may function as a room heater.

The invention may be outlined briefly as comprising a body member recessed upon one side thereof to receive a radiant type electrical heating element. This element is formed so as to provide a relatively flat face of substantial area to receive the bottom of a cooking utensil. The body member is secured to a permanent or portable support in such a manner that it may be swung either to a general upright position in which it radiates heat laterally for heating a room, or may be swung to a horizontal position in which the device may function as an electrical hot plate. Preferably locking means is provided so that when swung in horizontal position for use as a hot plate, it will be locked in this position until manually released. To prevent fire hazard or accidental burning by contact with the electrical heating elements, the body member is preferably provided with a foraminous guard or grill, which may be swung into operating position in front of the heating element when the device is being used as a room heater. When secured to one side of a cooking stove, it provides a convenient hot plate which may be readily swung into an out of the way position when not in use, or when it is desired to use the same as a room heater.

Referring to the drawings for a detail description of several specific embodiments of my invention, I have shown in Figs. 1 to 3 inclusive a body member 9 which preferably includes a forward member 10 of suitable material such as metal. Member 10 is spun or pressed to provide a depressed portion 11 forming a substantial cavity 12. Disposed within the cavity 12 there is an electrical heating element 13 which is preferably of such a type that it may be operated at a glowing temperature to radiate heat. A variety of electrical heating elements may be employed but I prefer for the purposes of this invention to utilize an element having a practically flat face of substantial area so as to conveniently receive the bottom of a cooking utensil. For example I have illustrated an electrical heating element of the type commonly used upon electrical cooking ranges and which is known as the open face type. Such an element comprises a relatively flat refractory support 14 which is grooved or otherwise formed to receive one or more convoluted resistance conductors 15.

The back side of the body member is enclosed by a suitable wall 17, which is preferably spaced from the inner portion of indentation 11 so as to provide a heat insulating air space 18. Apertures 19 and 21 are preferably provided with the upper and lower portions of member 10 so as to permit flow of convective currents of air into the lower portion of the casing and out thru the upper portion thereof when the body member is in a general upright position. To further insulate and keep the back wall 17 at a relatively low temperature, I preferably insert a baffle wall 22 between the back wall 17 and the inner wall of indentation 11.

In that modification of the invention shown in Figs. 1 to 3 inclusive, I have illustrated a portable support in the form of a stand 24 to which the body member 9 is tiltably secured. For example I have utilized a hinge connection 26 between stand 24 and back wall 17 so that the body member may be swung from the position shown in Fig. 2, to the position shown in Fig. 3. For locking the body member to the position shown in Fig. 3, I utilize suitable means such as collapsible brace comprising members 27 and 28 pivotally secured together and likewise pivotally secured to the stand 24 and to a portion of back wall 17. This collapsible brace as adapted to automatically lock in extended position when the body member is swung into the horizontal position shown in Fig. 3, and may be readily broken upwardly to permit the body members to swing in the position shown in Fig. 2. An elongated recess or indentation 31 may be provided in back wall 17 to provide space for this toggle brace when the same is in full collapsed position.

With the device as described above, it is obvious that when the body member is moved to a position such as shown in Fig. 2 it will radiate heat laterally and may be employed as a radiant type of room heater. When it is desired to employ the device as an electrical hot plate, it is swung to the horizontal position shown in Fig. 3 and cooking utensils or other objects to be heated may then be placed directly upon the heating element 13. To avoid fire hazard or injury when the device is employed as a room heater, it preferably provides a foraminous guard or grill 33 which may be positioned in front of the electrical heating element when the device is employed as a room heater, but which may be moved to an out of the way position when the device is being employed as an electrical hot plate. For example I have shown a hinge connection 34 between the upper edge of this guard and member 10 of the body. This arrangement permits the guard to be swung back to expose the face of the heating element when the body member is in horizontal position.

In that modification of the invention shown in Figs. 4 and 5, I have illustrated a device capable of being suspended from a room wall. In this case one edge of the body member 9 is provided with a hinge connection 36 with a suitable support plate 37. This supporting plate is provided with suitable means such as an aperture 39 to permit the same to be readily suspended upon a room wall. For locking the body member in horizontal position I have shown a suitable toggle brace 41 being connected to the lower portions of plate 37 and the body member 9, whereby the body member may be swung to its lower position upon breaking the toggle brace upwardly. In the lowered position shown in Fig. 5, the device simulates the appearance of an ordinary radiant type wall heater and is fully as effective as the standard appliances of this type.

In Figs. 6 and 7 I have illustrated a particularly advantageous arrangement in which the device serves as an auxiliary electrical appliance for a cooking range. In this case the body member 9 is hingedly secured to a suitable support member 42, and this member is mounted upon the side of a cooking range 43, as by means of a readily attachable clamp 44. When the body member 9 is in horizontal position the device may be employed as an electrical hot plate, either as an auxiliary plate for an electrical cooking range or as an electrical attachment to an ordinary gas or fuel range. It is obvious that an auxiliary device of this kind might occupy an inconvenient amount of room if permanently fixed to the cooking range. However with my arrangement, by collapsing the brace 41, the body member 9 and associated heating element may be readily swung to a lowered and out of the way position as shown in Fig. 7. In this position the device may also function as a room heater in a manner previously described.

It is obvious from the above description that I have provided an electrical appliance having far greater utility than standard devices which are useful for only one purpose. It frequently happens that a domestic consumer does not have occasion to employ either a room heater or a hot plate continuously, and therefore the purchase of a single device such as herein described will serve both these functions.

I claim:

An electrical heating device for universal application comprising a body member formed to provide a concavity on one side thereof, a radiant electrical heating element disposed in said concavity, said element being formed to provide a relatively flat outer face of substantial area to receive a cooking utensil, a support, means for tiltably securing said body member to said support, said securing means permitting the body member to assume two general positions, one position for heating a room by radiation in which the face of the heating element is substantially upright, and another position for use as a hot plate in which said face is substantially horizontal, and a foraminous guard hingedly secured to said body member and adapted to extend across in front of said element when the device is utilized as a room heater, the hinge connection for said guard being upon the upper edge of the same when said body member is substantially upright.

In testimony whereof, I have hereunto set my hand.

WILLIAM WESLEY HICKS.